United States Patent
Hokkirigawa et al.

(10) Patent No.: US 6,670,318 B2
(45) Date of Patent: *Dec. 30, 2003

(54) LIQUID CLEANSER

(75) Inventors: Kazuo Hokkirigawa, Yonezawa (JP); Motoharu Akiyama, Nagano-ken (JP); Noriyuki Yoshimura, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/125,802

(22) Filed: Apr. 18, 2002

(65) Prior Publication Data

US 2002/0183223 A1 Dec. 5, 2002

(30) Foreign Application Priority Data

Apr. 19, 2001 (JP) ........................................ 2001-121620

(51) Int. Cl.[7] .............................. C11D 3/00; C11D 9/00; C11D 17/00; C11D 17/08
(52) U.S. Cl. ...................... 510/397; 510/395; 510/418; 510/421; 510/426
(58) Field of Search ................................ 510/395, 397, 510/418, 421, 426, 236

(56) References Cited

U.S. PATENT DOCUMENTS

| 2,733,138 A | 1/1956 | Clark |
| 4,284,533 A | 8/1981 | Imamura et al. |
| 4,581,042 A | 4/1986 | Willmore |
| 4,981,665 A | 1/1991 | Boecker et al. |
| 5,916,499 A | 6/1999 | Murayama et al. |

FOREIGN PATENT DOCUMENTS

| DE | 19731653 | 1/1999 |
| JP | 02-080497 | 3/1990 |
| WO | WO 01/05931 | 1/2001 |

OTHER PUBLICATIONS

Article: *Development of Hard and Porous Carbon Material "RB Ceramics" Using Rice Bran as a Starting Material*; (Translation from "Zairyou Kagaku", vol. 17, No. 6, pp. 24 to 27, May 1997); Kazuo Hokkirigawa; 10 pp.

Primary Examiner—Yogendra N. Gupta
Assistant Examiner—John M. Petruncio
(74) Attorney, Agent, or Firm—Flynn, Thiel, Boutell & Tanis, P.C.

(57) ABSTRACT

A liquid cleanser comprises an aqueous medium, a surface active agent and a polishing material wherein the polishing material contains as at least one component thereof an RB ceramic and/or CRB ceramic powder.

9 Claims, No Drawings

LIQUID CLEANSER

BACKGROUND OF THE INVENTION

1. Field of the Invention

The invention relates to a liquid cleanser ensuring excellent dirtremovability.

2. Description of Prior Art

Liquid cleansers are now in wide use for removing degraded or scorched oil smears, fur at the sink dresser of kitchen, fur on bathtub, dirt on sash or furniture, rust on vehicle or bicycle, feces attached to toilet stools and the like, and also for removing a dark or somber skin of accessories such as of jewels or noble metals, or metallic articles so as to bring out the luster. Nevertheless, currently employed liquid cleansers are not necessarily enough and satisfactory for removability against oily and slimy fur in kitchen or the like.

SUMMARY OF THE INVENTION

An object of the invention is to provide a liquid cleanser which overcomes the drawbacks of the prior art and ensures excellent dirt or fur removability.

The inventors have found that an RB ceramic or a CRB ceramic described hereinafter is excellent as a polishing material and that because of their black color, these ceramics permit dirty spots to be readily found out and are thus suitable as a cleanser ingredient. The invention has been accomplished based on this finding.

More particularly, the invention provides a liquid cleanser, which comprises an aqueous medium, a surface active agent and a polishing material wherein the polishing material contains as at least one component thereof an RB ceramic or a CRB ceramic powder.

The RB ceramic used in the liquid cleanser of the invention is a carbonaceous material that is obtained by using rice bran produced at 900,000 tons/year in Japan and at 33,000,000 tons/year in the world, and is known according to the studies made by Kazuo Hokkirigawa, one of co-inventors of this application (see "Functional Materials" May 1997, Vol. 17, No. 5. pp. 24 to 28).

In this literature, reference is made to a carbon material (hereinafter referred to as RB ceramic) wherein the material is obtained by blending and kneading defatted bran derived from rice bran and a thermosetting resin, followed by drying a compact obtained by pressure forming and subsequently baking the dried compact in an atmosphere of an inert gas thus obtaining a carbon material (hereinafter referred to as RB ceramic).

The RB ceramic and a further improved, novel ceramic thereof (hereinafter referred to as CRB ceramic) are eco-friendly ceramic materials, which are obtained by mixing defatted bran derived from rice bran with a thermosetting resin with the following characteristic properties.

Higher hardness.
Smaller expansion coefficient.
Porous micro structure.
Good electric conductivity.
Small specific gravity and light weight.
Excellent abrasion resistance.
Easy to form and easy to fabricate in a die.
Ceramics having a diversity of features can be formed by blending different types of resins.
The materials being made of rice bran, they have little adverse effect on global environment, leading to conservation of natural resources.

The CRB ceramic used in the invention is an improved material of the RB ceramic obtained by mixing and kneading defatted bran, derived from rice bran, with a thermosetting resin, subjecting to primary baking in an inert gas at 700° C. to 1000° C., pulverizing the kneaded mixture after the primary baking into carborized powders passing through a sieve at a level of 100 mesh or below. The carbonized powder and the thermosetting resin are further mixed and kneaded, and pressure formed at a pressure of 20 MPa to 30 MPa, and subjecting the compact again to a heat treatment in an inert gas at a temperature in the range from 100° C. to 1100° C. to obtain a ceramic (hereinafter referred to as CRB ceramic). The greatest difference from the RB ceramic resides in that while the contraction ratio of the RB ceramic between the size of a final product and the size at the time of molding is as large as 25%, the CRB ceramic exhibits a contraction ratio as small as 3% or below. In this connection, however, this difference between the RB ceramic and the CRB ceramic may present a problem on dimensional accuracy when applied, for example, to compacts, but is of no problem because it is provided in the form of powder in the practice of the invention. Accordingly, the powders of both types of ceramics can be used without distinction.

EMBODIMENTS OF THE INVENTION

The RB ceramic and CRB ceramic materials used as powder in the cleanser of the invention are, respectively, mainly prepared from defatted bran, derived from rice bran, and also from a thermosetting resin.

The defatted bran is irrespective of the kind of rice and may be of domestic or foreign origin.

The thermosetting resin may be any ones so far as they are thermally curable, and typically include phenolic resins, diarylphthalate resins, unsaturated polyester resins, epoxy resins, polyimide resins, triazine resins, of which phenolic resins are used.

Thermoplastic resins, such as polyamides, may be used in combination within a range not departing from the spirit of the invention.

The mixing ratio between the defatted bran and the thermosetting resin ranges from 50:50 to 90:10, preferably, 70:30 to 80:20 on the weight base.

Next, a process of preparing the CRB ceramic material is briefly described.

The defatted bran obtained from rice bran and a thermosetting resin are mixed and kneaded, and subjected to a primarily baking in an inert gas at 700 to 1000° C., followed by pulverizing the kneaded mixture after the primary baking into carbonized powder. The powder and a thermosetting resin are mixed and kneaded, and pressure formed at a pressure of 20 MPa to 30 MPa, and again, the compact is subjected to a heat treatment in an inert gas at a temperature in the range from 100° C. to 1,100° C. The thermosetting resin used for the primary calcination should preferably be a liquid resin having a relatively small molecular weight.

For the primary baking, it is usual to use a rotary kiln, and the primary baking time ranges from about 40 to 120 minutes. The ratio between the carbonized powder obtained through the primary baking and the thermosetting resin ranges from 50:50 to 90:10, preferably 70:30 to 80:20 on the weight base.

The pressure for the pressure forming of the kneaded product of the carbonized powder and the thermosetting resin ranges from 20 to 30 MPa, preferably from 21 to 25 MPa. The temperature of the die is preferably at about 150° C.

For the heat treatment, an electric furnace that is fully controlled is usually used, and the thermal treating time ranges from about 60 to 360 minutes.

A preferred heat treatment temperature ranges from 500° C. to 1,100° C., and a heating rate before reaching the thermal treating temperature is such that relatively moderate temperature rise is required up to 500° C. More particularly, the heating rate is at 0.5 to 2° C./minute, preferably about 1° C./minute.

In order to lower the temperature after subjecting to such a heat treatment, it is required to lower the temperature moderately to a level of 500° C. When the temperature drops to 500° C. or below, the resultant product is allowed to cool naturally.

More particularly, the cooling rate is at 0.5 to 4° C./minute, preferably at about 1° C./minute.

The inert gas used in the course of the primary baking and heat treatment may be any of helium, argon, neon or nitrogen gas, of which nitrogen gas is preferred.

In the practice of the invention, the RB ceramic or CRB ceramic is used in the form of powder. Although the average size of the powder is in the range from 1 $\mu$m to 1,000 $\mu$m, preferably 250 $\mu$m or below, and more preferably 2 $\mu$m to 50 $\mu$m, powder having a larger particle size exhibits a better effect on rust removal against a frying pan whose surface is rusted.

The RB ceramic and CRB ceramic prepared in such a way as set forth hereinabove are commonly hard, porous and light in weight along with a good abrasion resistance. In addition, with the RB ceramic, it is tough and excellent in mechanical characteristics, and can serve in the cleanser of the invention as a novel polishing material in the form of powder. These ceramic powders are properly used depending on the characteristic properties required.

The microphotograph of this novel polishing material reveals that the powder surfaces have irregularities with sharp apexes, and thus, it is assumed that this polishing material has such a great dirt or fur-removing effect that a firmly stuck deposit is readily removable by polishing.

The powder of the RB or CRB ceramic is characteristic of its color. With inconspicuous dirt deposits, such as a slight deposit and a white deposit, the blackness of the powder attached thereto permits a residue of the deposit to be visually observed.

The cleanser according to the invention may further comprise polishing material ordinarily used in known cleansers.

Examples of such polishing materials include silica, alumina, silica sand, quartzite, calcium carbonate, magnesium oxide, chromium oxide, calcium phosphate, zeolite, titanium oxide, silicon carbide, calcite, dolomite, corundum, aluminium hydroxide, polymer beads and the like. These may be used singly or in combination of two or more.

The cleanser of the invention further comprises a surface active agent and an aqueous medium.

The surface active agents preferably include anionic surface active agents, nonionic surface active agents or amphoteric surface active agents.

Preferred examples of the anionic surface active agent include alkylbenzenesulfonates, alkylsulfonates, alkyl ether sulfates, and polyoxyalkylene alkylphenyl ether sulfates.

Preferred examples of the nonionic surface active agent include polyoxyalkylene alkyl ethers, polyoxyalkylene alkylphenyl ethers, fatty acid alkanolamides, fatty acid alkanolamide alkylene oxide adducts, and amine oxides such as alkyldimethylamide oxide.

Preferred examples of the amphoteric surface active agent include alkyl dimethylacetate betaines, and alkylamide betaines.

The aqueous medium preferably includes water and may contain a small amount of a water-soluble solvent such as an alcohol, a glycol, a ketone an ester or the like.

If necessary, the cleanser of the invention may be further formulated with additives ordinarily employed in conventional liquid cleansers within a range of amount not impeding the purposes and effects of the invention, e.g. dispersion stabilizers, thickening agents, alkali agents, microbicides, aromatics and the like.

Examples of the dispersion stabilizer include organic acids oxyacids such as, for example, malic acid, citric acid, tartaric acid and the like, polybasic acids such as malonic acid, aspartic acid and the like, and silicates. These are preferably used in combination.

Examples of the thickening agent include aspartates, guar gum, various types of cellulose derivatives, starch, bum arabi, and clays such as bentonite, montmorillonite, hectorite and the like.

Examples of the alkali agents include hydroxides, carbonates and phosphates of alkali metals, and organic alkalis such as mono, di, or triethanolamine, morpholine and the like.

Preferred contents of the respective components per the total amount of the cleanser of the invention are shown below.

The content of the RB ceramic or CRB ceramic powder should be selected within a range of from 1 to 70 wt %, preferably from 5 to 50 wt %.

If a conventional polishing material is contained, its content is selected within a range of from 1 to 70 wt %, preferably from 50 to 50 wt %.

The content of a surface active agent is preferably selected within a range of from 0.1 to 20 wt %, more preferably from 0.5 to 15 wt %.

With respect to the aqueous medium, its content is a balance excluding the total contents of the above components and optional additive components and is selected within a range of 20 to 80 wt %, preferably from 30 to 70 wt %.

The embodiments of the invention can be summarized as set out below.

(1) A liquid cleanser, characterized by comprising an aqueous medium, a surface active agent, and a polishing material wherein a powder of an RB ceramic or CRB ceramic is present as at least one component of the polishing material.

(2) The liquid cleanser as recited 1 above, further comprising one or more polishing materials selected from silica, alumina, silica sand, quartzite, calcium carbonate, magnesium oxide, chromium oxide, calcium phosphate, zeolite, titanium oxide, silicon carbide, calcite, dolomite, corundum, aluminium hydroxide and polymer beads.

(3) The liquid cleanser as recited in 1 or 2 above, wherein the surface active agent is made of an anionic surface active agent, a nonionic surface active agent or an amphoteric surface active agent.

(4) The liquid cleanser as recited in 3 above, wherein the anionic surface active agent is made of an alkylbenzenesulfonate, an alkylsulfonate, an alkyl ether sulfate or a polyoxyalkylene alkylphenyl ether sulfate.

(5) The liquid cleanser as recited in 3 above, wherein the nonionic surface active agent is made of a polyoxyalkylene alkyl ether, a polyalkylene alkylphenyl ether, a fatty acid alkanolamide, a fatty acid alkanolamide alkylene oxide adduct, or an amine oxide.

(6) The liquid cleanser as recited in any one of 1 to 5 above, wherein the content of the powder of the RB ceramic and/or CRB ceramic ranges from 1 to 70 wt % based on the total amount of the liquid cleanser.

(7) The liquid cleanser as recited in any one of 1 to 6 above, wherein the content of the polishing material ranges from 1 to 70 wt % based on the total amount of the liquid cleanser.

(8) The liquid cleanser as recited in any one of 1 to 7 above, wherein the content of the surface active agent ranges from 0.1 to 20 wt % based on the total amount of the liquid cleanser.

(9) The liquid cleanser as recited in any one of 1 to 8 above, wherein the powder of the RB ceramic and/or CRB ceramic has an average size of 1 $\mu$m to 1,000 $\mu$m.

The invention is described in more detail by way of examples, which should not be construed as limiting the invention thereto.

EXAMPLE 1

Preparation of CRB Ceramic Powder 75 kg of defatted bran derived from rice bran and 25 k g of a liquid phenolic resin (resol) were mixed and kneaded while heating to 50° C. to 60° C. A plastic homogeneous mixture was obtained.

The mixture was formed into a round body having 3 cm in diameter and baked by use of a rotary kiln in an atmosphere of nitrogen at 950° C. for 60 minutes. The resultant carbonized, baked product was pulverized by means of a crusher, and crushed into finer particles in a ball mill to obtain an RB ceramic powder having an average primary particle size of 5 $\mu$m (hereinafter referred to as RB-a). A liquid cleanser consisting of 50 g of RB-a, 5 g of lauric acid diethanolamide and 45 g of water.

EXAMPLE 2

An RB ceramic powder (hereinafter referred to as RB-b) having an average primary size of 2 $\mu$m was obtained in the same manner as in Example 1. A liquid cleanser consisting of 25 g of RB-b, 25 g of calcite (having an average primary particle size of 10 $\mu$m), 5 g of lauric acid diethanolamide and 45 g of water.

EXAMPLE 3

Preparation of CRB Ceramic Powder 75 kg of defatted bran derived from rice bran and 25 kg of a liquid phenolic resin (resol) were mixed and kneaded while heating to 50° C. to 60° C. A plastic homogeneous mixture was obtained.

The mixture was primarily baked by use of a rotary kiln in an atmosphere of nitrogen at 950° C. for 60 minutes. The resultant carbonized, baked product was pulverized by means of a crusher and sieved through a 100 mesh sieve to obtain a carbonized powder having a size of 50 to 250 $\mu$m.

75 kg of the thus obtained carbonized powder and 25 kg of a solid phenolic resin (resol) were mixed and kneaded while heating to 100° C. to 150° C. A plastic homogeneous mixture was obtained.

The mixture was formed into a round body having a diameter of 3 cm and secondarily baked by use of a rotary kiln in an atmosphere of nitrogen at 600° C. The resultant carbonized, baked product was pulverized by means of a grinding machine, and divided into finer particles in a ball mill to obtain a CRB ceramic powder having an average primary particle size of 20 $\mu$m (hereinafter referred to as CRB-a). A liquid cleanser consisting of 50 g of RB-a, 5 g of lauric acid diethanolamide and 45 g of water.

EXAMPLE 4

A CRB ceramic powder (hereinafter referred to as CRB-b) having an average primary particle size of 15 $\mu$m was obtained in the same manner as in Example 3 except that the secondary baking temperature was set at 700° C. A liquid cleanser consisting of 35 g of RB-b, 3 g of sodium dodecylbenzenesulfonate and 62 g of water.

EXAMPLE 5

A CRB ceramic powder (hereinafter referred to as CRB-c) having an average primary particle size of 15 $\mu$m was obtained in the same manner as in Example 3 using a secondary baking temperature set at 800° C. A liquid cleanser consisting of 25 g of the CRB-c, 2 g of sodium polyoxyethylene (p=3) lauryl ether sulfate and 73 g of water was prepared.

EXAMPLE 6

A CRB ceramic powder (hereinafter referred to as CRB-d) having an average primary particle size of 5 $\mu$m was obtained in the same manner as in Example 3 using a secondary baking temperature set at 900° C. A liquid cleanser consisting of 15 g of the CRB-d, 10 g of polyoxyethylene (p=10) lauryl ether and 75 g of water was prepared.

EXAMPLES 7 TO 12 AND COMPARATIVE EXAMPLES 1 TO 6

Different types of liquid cleansers, respectively, having formulations indicated in Table 1 were prepared.

TABLE 1

| | Examples | | | | | | | | | | | | Comparative Examples | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 | 6 |
| RB-a | 50 | | | | | | | | | | 10 | | | | | | | |
| RB-b | | 25 | | | | | | | | | | 8 | | | | | | |
| CRB-a | | | 50 | | | | 30 | | | | | | | | | | | |
| CRB-b | | | | 35 | | | | 25 | | | | 15 | | | | | | |
| CRB-c | | | | | 25 | | | | 15 | | 10 | | | | | | | |
| CRB-d | | | | | | 15 | | | | 10 | | | | | | | | |
| Calcium carbonate | | 25 | | | | | | | | | 10 | | 50 | | | | | |
| Zeolite | | | | | | | 15 | | | | | 5 | | 30 | | | | |
| quartzite | | | | | | | | | | 7 | | | | | 40 | | | |
| Alumina | | | | | | | | | 15 | | | | | | | 35 | | |
| Titanium oxide | | | | | | | | | | 20 | | | | | | | 25 | |
| Dolomite | | | | | | | | 5 | | | | | | | | | | 20 |
| DBSNa | | | | 3 | | | | | | | | 5 | | | | | | |
| POELSNa | | | | | 2 | | | | 8 | | | | 5 | | | | | |
| DSNa | | | | | | | | 15 | | | 5 | | | | | | 10 | |
| POLE | | | | | | 10 | | | | | | | | | 5 | | | 15 |
| LEN | 5 | 5 | 5 | | | | | | | | | | | 10 | | | | |
| DDAO | | | | | | | 4 | | | | | | | | | 5 | | |
| Water | 45 | 45 | 45 | 62 | 73 | 75 | 51 | 55 | 62 | 63 | 65 | 67 | 45 | 50 | 55 | 60 | 65 | 65 |
| Dirty deposit removability | ○ | ○ | ○ | ○ | ○ | ○ | ○ | ○ | ○ | ○ | ○ | ○ | Δ | Δ | Δ | Δ | Δ | X |

Abbreviations indicated in the table have the following meanings, respectively.
DBSMa: sodium dodecylbenzenesulfonate
POLSNa: sodium polyoxyethylene (p = 3) lauryl ether sulfate
DSNa: sodium dodecylsulfonate
POLE: polyoxyethylene (p = 10) lauryl ether
LEN: lauric acid diethanolamide
DDAO: dedecyldimethylamide oxide The degree of removal of dirty deposits (dirty deposit removability) was evaluated through visual observation based on the following standards according to the following procedure: the liquid cleaners obtained in these examples and comparative examples were, respectively, provided as a sample; and 10 panelers cleansed a stainless steel bath tub, on which an incrustation such as fur that was not removed at all by mere rubbing, by rubbing off the incrustation with sponge impregnated with each cleanser sample. The results are shown in Table 1 above.

○: good
Δ: moderate
×: poor

The cleanser of the invention is excellent in dirty deposit removability and permits inconspicuous deposits to be visually observed as a deposit residue due to the blackness of the powder attached thereto.

What is claimed is:

1. A liquid cleanser comprising an aqueous medium, a surface active agent, and a polishing material, wherein an RB ceramic and/or CRB ceramic powder is contained as at least one component of said polishing material.

2. The liquid cleanser according to claim 1, further comprising one or more polishing materials selected from silica, alumina, silica sand, quartzite, calcium carbonate, magnesium oxide, chromium oxide, calcium phosphate, zeolite, titanium oxide, silicon carbide, calcite, dolomite, corundum, aluminium hydroxide and polymer beads.

3. The liquid cleanser according to claim 1, wherein said surface active agent is made of an anionic surface active agent, a nonionic surface active agent or an amphoteric surface active agent.

4. The liquid cleanser according to claim 3, wherein said anionic surface active agent is made of an alkylbenzenesulfonate, an alkylsulfonate, an alkyl ether sulfate or a polyoxyalkylene alkylphenyl ether sulfate.

5. The liquid cleanser according to claim 3, wherein said nonionic surface active agent is made of a polyoxyalkylene alkyl ether, a polyalkylene alkylphenyl ether, a fatty acid alkanolamide, a fatty acid alkanolamide alkylene oxide adduct, or an amine oxide.

6. The liquid cleanser according to claim 1, wherein a content of the RB ceramic and/or CRB ceramic powder ranges from 1 to 70 wt. % based on the total amount of the liquid cleanser.

7. The liquid cleanser according to claim 1, wherein a content of said polishing material ranges from 1 to 70 wt. % based on the total amount of the liquid cleanser.

8. The liquid cleanser according to claim 1, wherein a content of said surface active agent ranges from 0.1 to 20 wt. % based on the total amount of the liquid cleanser.

9. The liquid cleanser according to claim 1, wherein the RB ceramic and/or CRB ceramic powder has an average size of 1 μm to 1,000 μm.

* * * * *